(12) United States Patent
Muraskin et al.

(10) Patent No.: US 8,623,314 B2
(45) Date of Patent: Jan. 7, 2014

(54) CHILLED AMMONIA BASED $CO_2$ CAPTURE SYSTEM WITH AMMONIA RECOVERY AND PROCESSES OF USE

(75) Inventors: David James Muraskin, Knoxville, TN (US); Sanjay Kumar Dube, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/401,236

(22) Filed: Feb. 21, 2012

(65) Prior Publication Data

US 2013/0004400 A1 Jan. 3, 2013

Related U.S. Application Data

(60) Provisional application No. 61/503,732, filed on Jul. 1, 2011.

(51) Int. Cl.
| | | |
|---|---|---|
| *C01C 1/02* | (2006.01) | |
| *C01C 1/24* | (2006.01) | |
| *C01C 1/242* | (2006.01) | |
| *B01D 19/00* | (2006.01) | |
| *B01D 53/50* | (2006.01) | |

(52) U.S. Cl.
USPC ......... 423/357; 423/555; 423/243.11; 95/251

(58) Field of Classification Search
USPC ............... 423/357, 352, 356, 243.11; 95/235, 95/251; 210/749, 750, 765, 766; 203/21; 159/47.2

See application file for complete search history.

(56) References Cited

U.S. PATENT DOCUMENTS

| | | | | |
|---|---|---|---|---|
| 4,294,812 | A | * | 10/1981 | Oler ............................. 423/357 |
| 5,770,166 | A | * | 6/1998 | Shimizu et al. ............... 422/172 |
| 6,531,104 | B1 | | 3/2003 | Borio et al. |
| 7,846,240 | B2 | | 12/2010 | Gal et al. |
| 7,862,788 | B2 | | 1/2011 | Gal et al. |
| 7,867,322 | B2 | | 1/2011 | Gal |
| 2009/0155889 | A1 | * | 6/2009 | Handagama et al. ...... 435/262.5 |
| 2010/0139488 | A1 | * | 6/2010 | Murphy .......................... 95/199 |

FOREIGN PATENT DOCUMENTS

WO 2006022885 A1 3/2006

* cited by examiner

*Primary Examiner* — Steven Bos
*Assistant Examiner* — Justin Bova
(74) *Attorney, Agent, or Firm* — Robert D. Crawford

(57) ABSTRACT

Processes for recovering ammonia from an ammonium sulfate stream include reacting the ammonia sulfate stream with a lime slurry to form a slurry comprising calcium sulfate and ammonia; providing the slurry comprising calcium sulfate and ammonia to a stripper configured to recover the ammonia from the slurry; utilizing a heat source from a chilled ammonia process to the stripper; and extracting an ammonia vapor stream from the stripper. Also disclosed are systems for performing the processes.

8 Claims, 4 Drawing Sheets

CHILLED AMMONIA BASED $CO_2$ CAPTURE SYSTEM WITH AMMONIA RECOVERY AND PROCESSES OF USE

CROSS REFERENCE TO RELATED APPLICATION

This application claims the benefit of U.S. Provisional Application Ser. No. 61/503,732 filed Jul. 1, 2011, which is fully incorporated herein by reference in its entirety.

BACKGROUND

The present disclosure generally relates to systems and processes for $CO_2$ capture entrained in flue gases. More particularly, the present disclosure relates to the efficient recovery of ammonia from the ammonium sulfate byproduct of the chilled ammonia process in the carbon capture system.

Most of the energy used in the world is derived from the combustion of carbon and hydrogen-containing fuels such as coal, oil and natural gas. In addition to carbon and hydrogen, these fuels contain oxygen, moisture and undesirable contaminants such as $SO_x$, e.g., $SO_2$, $SO_3$ and the like, $NO_x$, mercury, chlorine, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of contaminants Numerous processes and systems have been developed in response to the desire to achieve near zero emission of contaminants. Systems and processes include, but are not limited to desulfurization systems (known as wet flue gas desulfurization systems ("WFGD") and dry flue gas desulfurization systems ("DFGD")), particulate filters (including, for example, bag houses, particulate collectors, and the like), as well as the use of one or more sorbents that absorb contaminants from the flue gas. Examples of sorbents include, but are not limited to, activated carbon, ammonia, limestone, and the like.

It has been shown that ammonia, as well as amine solutions, efficiently removes $CO_2$, as well as other contaminants, such as sulfur dioxide ($SO_2$) and hydrogen chloride (HCl), from a flue gas stream. In one particular application, $CO_2$ is absorbed in an ammoniated solution at temperatures lower than the exit temperature from the flue gas desulfurization system, for example, between 0 and 30 degrees Celsius (0°-30° C.). The SOx contaminants, e.g., $SO_2$, $SO_3$, remaining in the flue gas coming from the wet flue gas desulfurization (WFDS) and/or dry flue gas desulfurization (DFGD) is often captured by ammonia to produce an ammonium sulfate bleed stream. Ammonium sulfate is also produced in the ammonia reduction stages of the carbon capture from the exhaust flue gas Ammonium sulfate can be used as a commercial fertilizer, but processing of the ammonium sulfate byproduct can be energy and capital cost intensive. In some cases, the use of crystallization, evaporation, agglomeration equipment is needed in order to produce the fertilizer product for commercial use. In addition, a large area for silos\bins for indoor storage of the ammonium sulfate byproduct may be needed on-site to insure plant availability. In addition, trace metals may be present in the ammonium sulfate stream that may require further treatment or disposal of the ammonium sulfate stream as a hazardous waste. For example, for $CO_2$ capture systems which use amine solutions, sulfur compounds present in the flue gas will react with the amine reagent and render it useless. The sulfonated amine must then be discarded and replenished with fresh reagent. The result is higher operating costs and capital costs because of the larger equipment needed to account for sulfur and the higher reagent make-up rates.

An alternative approach to the handling and/or disposal of the ammonium sulfate byproduct from the carbon capture system utilizes a lime boil process, in which the ammonium sulfate is converted to calcium sulfate and the ammonia is recovered. This alternative process, however, uses a significant amount of heat in order to convert the ammonium sulfate and recover ammonia.

Accordingly, there is a need in the art for improved systems and processes for handling the ammonium sulfate byproduct and recovering the ammonia in carbon capture systems.

BRIEF SUMMARY

Disclosed herein are processes and systems chilled ammonia based carbon dioxide capture, and particularly for recovering the ammonia utilized in the process. In one embodiment, an exemplary process for recovering ammonia from an ammonium sulfate stream includes reacting the ammonia sulfate stream with a lime slurry to form a slurry comprising calcium sulfate and ammonia; providing the slurry comprising calcium sulfate and ammonia to a stripper configured to recover the ammonia from the slurry; utilizing a heat source from a chilled ammonia process to the stripper; and extracting an ammonia vapor stream from the stripper.

In another embodiment, a process for recovering sodium hydroxide from a sodium sulfate stream includes reacting the sodium sulfate stream with a lime slurry to form a slurry comprising calcium sulfate and sodium hydroxide; providing the slurry comprising calcium sulfate and sodium hydroxide to a gypsum thickener configured to separate the calcium sulfate from the sodium hydroxide; extracting a sodium hydroxide stream from the gypsum thickener.

A system for recovering ammonia from an ammonium sulfate stream includes an ammonium sulfate stream produced by a sulfur removal device and/or a carbon dioxide removal system in a chilled ammonia process; a lime slake mill in fluid communication with the ammonium sulfate stream, wherein the lime slake mill is configured to slake the lime to form a lime slurry; at least one reaction tank in fluid communication with the lime slake mill, the at least one reaction tank configured to react the lime slurry with the ammonium sulfate stream and produce a slurry comprising calcium sulfate and ammonia; a stripper in fluid communication with the at least one reaction tank, wherein the stripper is configured to remove the ammonia from the slurry comprising calcium sulfate and ammonia and form an ammonia vapor stream; and a heat exchanger in fluid communication with the stripper and configured to exchange heat between a heat source stream from the chilled ammonia process and the slurry comprising calcium sulfate and ammonia.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
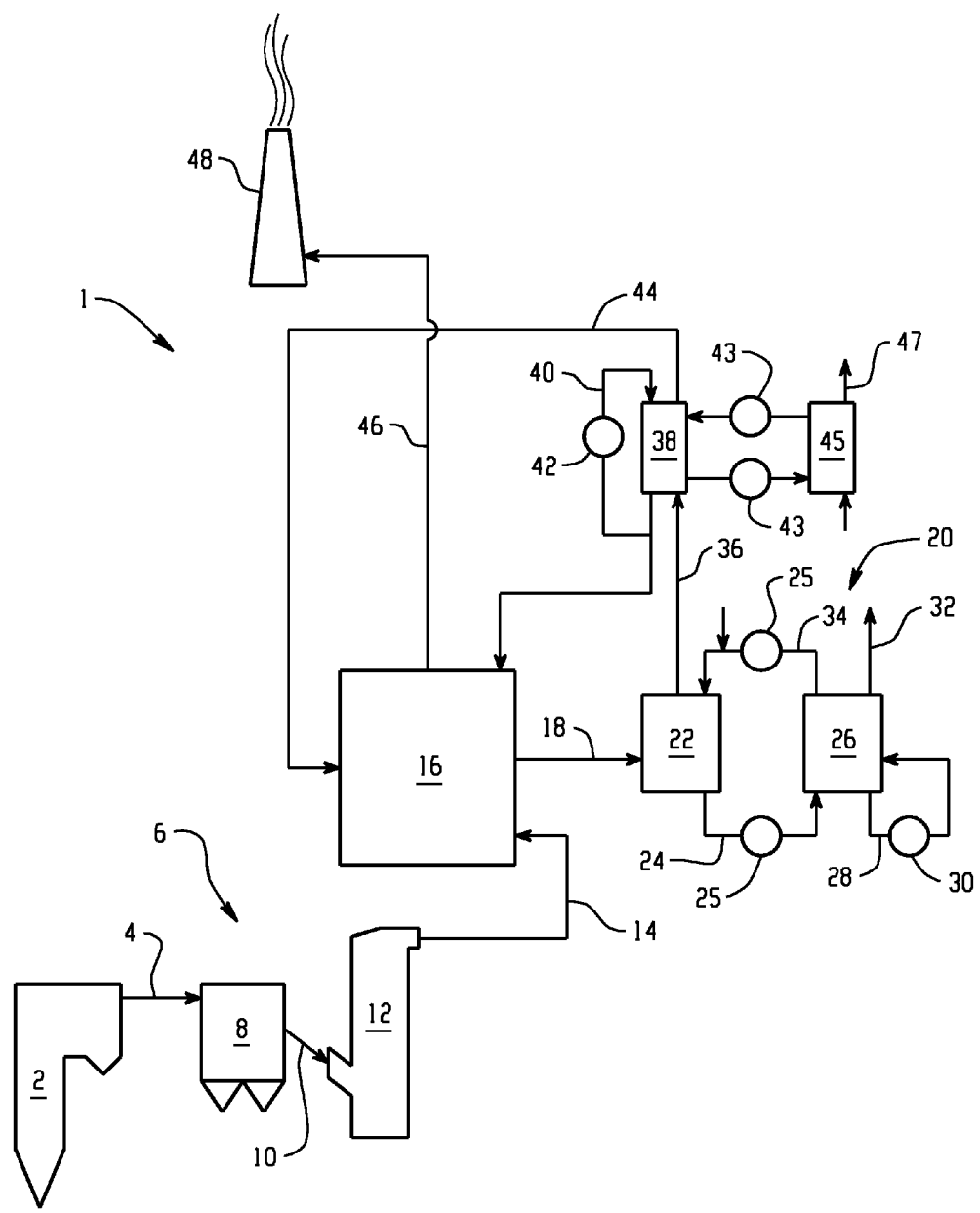
FIG. 1 is a schematic view depicting an example of a power plant.

Disclosed herein are systems and processes for efficiently handling the ammonium sulfate byproduct of the acid gas capture and ammonia reduction stages of the chilled ammonia processes ("CAP") in a carbon capture system ("CCS"). The system and process generally includes the integration of certain CCS streams in a lime boil process for converting the ammonium sulfate byproduct in order to reduce the energy required by the lime boil process. More particularly, the integrated CCS streams can include sources of heat from the CAP, such as the overhead from the ammonia stripper or the carbon dioxide-lean solution from the regenerator. The use of such existing heat sources within the system to provide heat to the lime boil process reduces the energy penalties associated with use of the lime boil process for the handling/disposal of the ammonium sulfate byproduct. While reference will be made to CAP and apparatuses, the present disclosure can also be utilized in advanced amine and oxy-fuel processes and apparatuses configured as such.

As mentioned, ammonium sulfate can be produced in at least two locations within a CCS. For example, ammonium sulfate can be a byproduct stream from a sulfur dioxide removal stage in the Direct Contact Cooler or it can also be formed in the Direct Contact Heater stage of the CAP process, where the ammonia is being removed from the flue gas, which is leaner in carbon dioxide gas. Both sources of ammonium sulfate are described in more detail below with reference to FIG. 1, which schematically illustrates a power plant 1. The power plant 1 comprises a boiler 2. During the combustion of a fuel, such as coal or oil, a hot process gas, often referred to as a flue gas, is generated in the boiler 2. The flue gas, which contains polluting substances, including dust particles, sulfur dioxide, $SO_2$, sulfur trioxide, $SO_3$, and carbon dioxide, $CO_2$, leaves the boiler 2 via a gas duct 4. The gas duct 4 is configured to forward the flue gas to a conventional air pollution control system 6. The conventional air pollution control system 6 includes a dust collector 8, in the form of, e.g., an electrostatic precipitator or fabric filter. Furthermore, the conventional air pollution control system 6 comprises a duct 10 configured to forward the flue gas from the dust collector 8 to a sulfur dioxide removal device 12, sometimes referred to as a Flue Gas Desulfurization system (FGD), in the form of a wet scrubber or dry scrubber. In a wet/dry scrubber, at least a portion of the sulfur dioxide is removed from the flue gas by means of contacting the flue gas with an alkali, typically lime/limestone or an ammonia-based scrubbing solution. Flue gas in coal or oil fired power plants contains sulfur dioxide, which is formed when sulfur-laden coal or oil is combusted. The reaction of the ammonia, sulfur dioxide and oxygen produces ammonium sulfate. As will be discussed in greater detail below, this ammonium sulfate byproduct stream is sent to a lime boil process where it can be converted to calcium sulfate and ammonia, the later of which can be recycled back through the system.

The conventional air pollution control system 6 could comprise further devices, such as a selective catalytic reduction reactor, for removing nitrogen oxides from the flue gas, such further devices not shown in FIG. 1 for reasons of clarity of illustration. The flue gas, which comprises very small amounts of most pollutants, but still most of the original concentration of carbon dioxide, leaves the conventional air pollution control system 6 via a duct 14. The duct 14 is configured to forward the flue gas to a combined cooling and cleaning system 16. The flue gas then leaves the combined cooling and cleaning system 16 via a duct 18. The flue gas in the duct 18 has a temperature of about 0-30° C., specifically 0-5° C. The duct 18 is configured to forward the flue gas to a carbon dioxide removal system 20. As mentioned previously, the type of carbon dioxide removal system 20 described herein is sometimes referred to as the Chilled Ammonia Process, CAP. Another exemplary embodiment of a CAP is described in WO 2006/022885, which is incorporated herein by reference in its entirety.

The carbon dioxide removal system 20 comprises a $CO_2$-absorber 22 in which the flue gas is brought into contact with an ammoniated slurry or solution. A pipe 24 is configured to forward, by means of a high pressure pump (not shown for reasons of clarity), a $CO_2$-enriched slurry or solution from the $CO_2$-absorber 22 to a regenerator 26. Heat is provided to the regenerator 26 by heating stream 28 in heater 30. The high pressure and high temperature in the regenerator 26 causes the release of high-pressure gaseous $CO_2$, stream 32. A pipe 34 is configured to return $CO_2$-lean ammoniated solution or slurry, that has been cooled in a chiller (not shown), from the regenerator 26 to the $CO_2$-absorber 22. As will be described later, at least a portion of this CO2-lean ammoniated solution or slurry can be diverted to the lime boil process to provide heat to the endothermic reaction of lime with the ammonium sulfate. Heat exchangers 25 can be disposed between the absorber 22 and the regenerator 26 to control the temperatures of the streams in pipes 24 and 34 circulating between the two components and also to reduce the energy consumption in the regenerator 26.

A duct 36 is configured to forward the flue gas, now having a low concentration of carbon dioxide, from the $CO_2$-absorber 22 to a water wash vessel 38, which is operative for removing ammonia, $NH_3$, from the flue gas that has been treated in the $CO_2$-absorber 22. A stream 40 of cold water or cold and slightly acidic solution is cooled in a heat exchanger 42 and is supplied to the water wash vessel 38. A duct 44 is configured to forward the flue gas, which has been cleaned in the water wash vessel 38, to the combined cooling and cleaning system 16 for further removal of the ammonia from the flue gas by means of sulfuric acid.

An ammonia stripper 45 can be disposed in fluid communication with the water wash vessel 38. The ammonia stripper 45 is configured to recover the ammonia captured from the flue gas in the water wash vessel 38. In the ammonia stripper 45, water stream, now containing the ammonia removed from the flue gas, can be heated at a temperature which boils off the contaminants to form a stripper offgas stream 47, while the remaining liquid phase can continue back through the water wash vessel 38. The ammonia stripper is described in greater detail below, and as will be seen, can be used in other locations within the power plant. Similar to the absorber 22 and regenerator 26 pair, heat exchangers 43 can be disposed between the water wash vessel 38 and the ammonia stripper 45 to control the temperatures of the streams circulating between the two components and also to reduce the energy consumption in the stripper 45.

A duct 46 is configured to forward the flue gas, which has been cleaned further in the combined cooling and cleaning system 16, to a stack 48 which releases the cleaned flue gas to the atmosphere.

Figure 2:
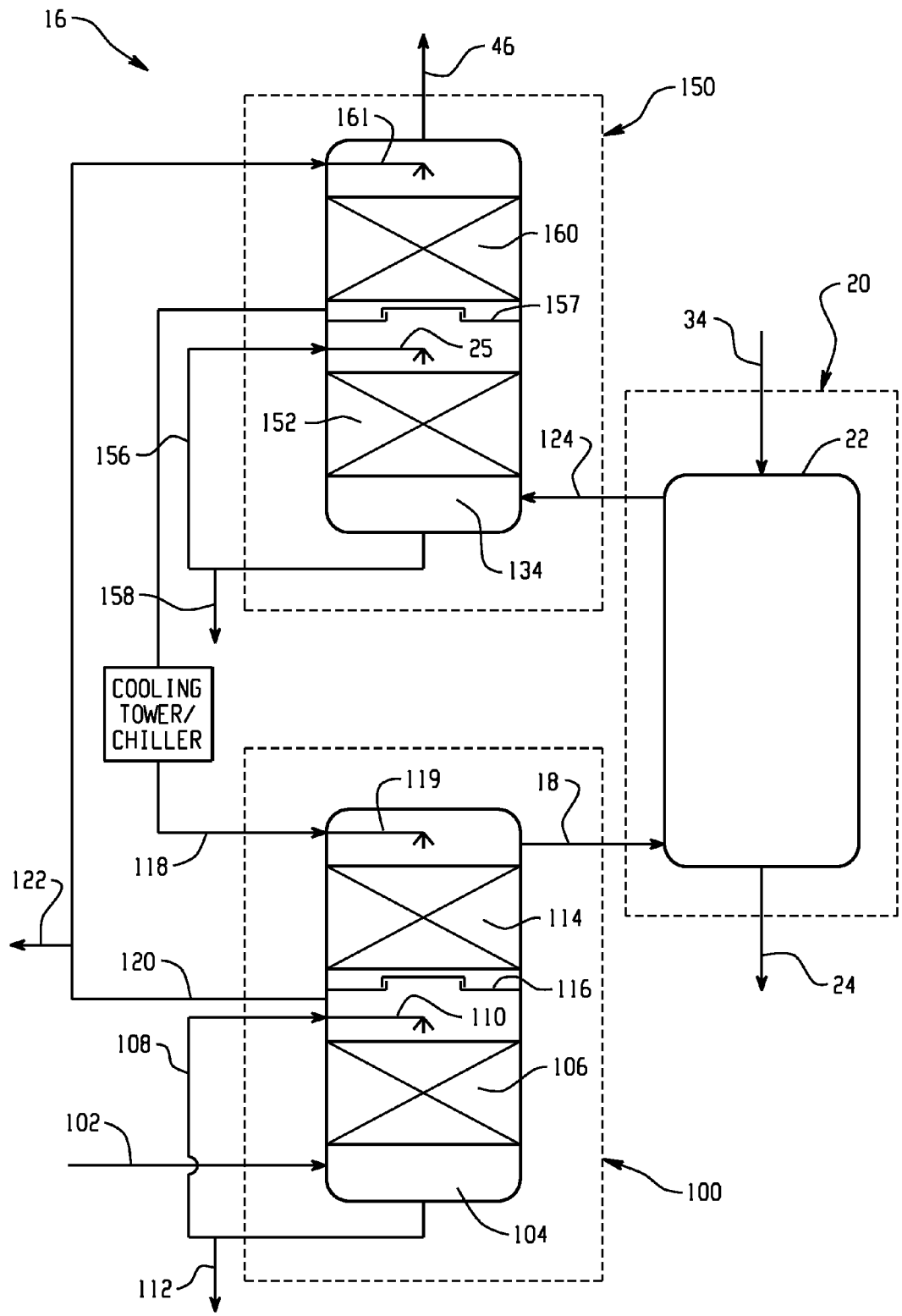
FIG. 2 is a schematic view depicting an example of a combined cooling and cleaning system.

FIG. 2 illustrates the combined cooling and cleaning system 16 in more detail. The combined cooling and cleaning system 16 comprises a pre-conditioning section 100, a post-conditioning section 150, and is in fluid communication with the carbon dioxide removal system 20. The pre- and post-conditioning sections are arranged in liquid connection such that liquid used in one of the sections may be reused in another section as explained in further detail below.

The pre-conditioning section 100, which is arranged upstream of the carbon dioxide removal system 20, with respect to the flow direction of the gas stream, comprises a number of gas-liquid contacting devices for directly contacting the gas stream with a liquid. The post-conditioning section 150, which is arranged downstream of the carbon dioxide removal system 20, with respect to the flow direction of the gas stream, similarly comprises a number of gas-liquid contacting devices for directly contacting the gas stream with a liquid.

The gas-liquid contacting devices of the pre- and post-conditioning sections may be integrated in vessels comprising more than one gas-liquid contacting device arranged in sequence, such that a gas stream which is fed to the vessel enters and exits each gas-liquid contacting device in sequence, before exiting the vessel. Alternatively, each of the gas-liquid contacting devices of the pre- and post-conditioning sections may independently be arranged as separate gas-liquid contacting vessels connected in series, such that the gas stream enters and exits each gas-liquid contacting vessel in sequence.

Each gas-liquid contacting device is arranged to bring the gas stream into contact with a liquid. The contacting may be performed in counter current flow such that the gas enters the gas-liquid contacting device at one end (typically at the bottom) and the liquid solution enters the gas-liquid contacting device at the other end (typically at the top).

Liquid used in one gas-liquid contacting device is generally at least partly collected at the bottom of the gas-liquid contacting device or in a separate buffer or storage tank in liquid connection with the bottom of the gas-liquid contacting device, such that liquid exiting the gas-liquid contacting device is collected therein. In an integrated vessel as described above, liquid may be collected and withdrawn from one gas-liquid contacting device and optionally redirected to the same or another gas-liquid contacting device, located upstream or downstream of the first device.

The flue gas is forwarded in the opposite direction and may pass through or alongside the collected liquid. In this case, a liquid collection receptacle may be arranged in between two gas-liquid contacting devices, whether arranged separately or integrated, and may, for example, comprise a sloped collection tray or bubble cap tray. Such liquid collection receptacles may further comprise one or more liquid outlets configured for removal of the collected liquid.

The pre-conditioning section 100 of the system 16 in FIG. 2 receives a gas stream, such as flue gas, via a gas inlet 102 at the bottom 104 of a gas-liquid contacting device 106. The gas-liquid contacting device, also referred to as the sulfur removal device 106, is configured to remove $SO_2$ from the flue gas. In the sulfur removal device 106, flue gas, having a temperature of, for example, 40-80° C., such as 45-60° C., is forwarded upwards and contacted with a liquid comprising ammonia having a pH-value of approximately 4-6 at flue gas saturation temperature. The liquid is supplied via pipe 108 and distributed over the sulfur removal device by a set of nozzles 110 or pipes with holes for liquid distribution. The sulfur removal device 106 contains a structured packing, or another suitable gas-liquid contacting filling.

$SO_2$, and optionally other acidic gases such as HCl, HF, $SO_3$, is removed from the flue gas by formation of ammonium sulfate upon contact with the ammonia comprised in the liquid. The used liquid, containing e.g. 40%, such as 15-40% ammonium sulfate by weight, is collected in a liquid collection receptacle at the bottom 104 of the sulfur removal device. Dissolved ammonium sulfate is removed by a bleed stream 112. The remaining liquid is via pipe 108 directed for reuse in the sulfur removal device 106. The pH-value of the liquid may be adjusted by addition of ammonia to the bottom 104 of the device (not shown).

The flue gas depleted in $SO_2$ leaving the sulfur removal device 106 enters another gas-liquid contacting device 114 via the liquid collection receptacle 116. The gas-liquid contacting device 114, containing a structured packing, or another suitable gas-liquid contacting filling, is also referred to as the gas cooling device 114. The flue gas thus passes through the liquid used in the gas cooling device before entering the gas cooling device 114. In the gas cooling device 114, the flue gas depleted in $SO_2$, still having a high temperature of, e.g. 40-80° C., specifically 45 60° C., is, while forwarded upwards, directly contacted with a cooling liquid. The cooling liquid, having a temperature of, for example, 5-35° C. depending on ambient conditions and for example process cooling tower operation, and consisting essentially of water, is supplied via pipe 118 and distributed by a set of nozzles 119, or pipes with holes for liquid distribution, over the gas cooling device. The gas cooling device 114 thus functions as a heat-exchanging device by transferring heat from the flue gas to the cooling liquid. In addition, any water is condensed from the flue gas. The stream 118 can be sent to either cooling tower or mechanical chiller or the combination of both cooling tower and mechanical chiller before returning it back to the gas cooling device 114.

The thus heated liquid formed in the gas cooling device 114 is collected in the liquid collection receptacle 116, withdrawn via pipe 120 and forwarded for use in the post-conditioning section 150 as described below. A bleed stream, containing flue gas condensate liquid, is via pipe 122 withdrawn from the used liquid. The pre-conditioning section of the system 16 of FIG. 2 thus provides a cool and $SO_2$ depleted flue gas for supply via duct 18 to the carbon dioxide removal system 20.

The carbon dioxide removal system 20 comprises the single $CO_2$ absorber 22. In other embodiments, the system can include a series of $CO_2$ absorbers. The flue gas is brought into contact with ammoniated liquid, supplied via pipe 34. $CO_2$ is captured into the ammoniated liquid and the resulting $CO_2$-enriched slurry or solution 24 is passed, for example by means of a high pressure pump, from the absorber(s) 22 to the regenerator 26 (shown in FIG. 1). High pressure and high temperature in the regenerator causes the release of high-pressure gaseous $CO_2$. The $CO_2$ lean ammoniated liquid or slurry resulting from regeneration is cooled and forwarded for reuse in the $CO_2$ absorber 22 via pipe 34.

A duct 124 is operative for forwarding flue gas, having a low concentration of $CO_2$, from the $CO_2$ absorber(s) 22 to the post-conditioning section 150. Prior to processing in the post-conditioning section, the flue gas may optionally be subjected to water wash (not shown) in order to remove ammonia from the flue gas.

The post-conditioning section 150 thus receives $CO_2$ depleted flue gas, having a temperature of, for example, 0-25° C., such as 0-10° C. or such as 0-5° C., and an ammonia content of, for example, 200 ppm, from the $CO_2$ removal system 20. The post-conditioning section comprises at least a first gas-liquid contacting device 152, also referred to as the ammonia removal device 152, which is arranged to receive the flue gas supplied via duct 124 via the liquid collection receptacle 154. The ammonia removal device 152 is arranged to, at least partly, remove ammonia from the flue gas by bringing the flue gas into direct contact with acidic liquid comprising ammonium sulfate and having a pH-value of approximately 3 4. The acidic liquid is supplied via pipe 156 and distributed over the ammonia removal device 152 by a set of nozzles 157, or by pipes with holes for liquid distribution. The flue gas enters at the bottom of the device 152 and is forwarded upwards through the device 152. In the ammonia removal device 152, which contains a structured packing or another suitable gas-liquid contacting filling, the flue gas is contacted with the liquid having a low temperature. Ammonium sulfate at a concentration of, for example, 0-40%, such as 15-40% or 30-35% by weight, is formed in the liquid and removed by bleed stream 158. The remaining acidic liquid is, via pipe 156, directed for reuse in the ammonia removal device. If needed, the pH-value of the liquid may be adjusted by addition of $H_2SO_4$ to the bottom of the device.

The flue gas depleted in ammonia is forwarded from the ammonia removal device to a second gas-liquid contacting device of the post-conditioning section 150. The second gas-liquid contacting device 160 is also referred to as the gas heating device 160. The flue gas passes through the liquid collection receptacle 157, in which the liquid used in the gas heating device 160 is collected. The gas heating device 160, containing a structured packing or another suitable gas-liquid contacting filling, is arranged to bring the flue gas, having essentially the same temperature as when entering the ammonia removal device, into direct contact with a heating liquid. The heating liquid, supplied via pipe 120 and distributed over the device 160 by a set of nozzles 161 or by pipes with holes for liquid distribution, is essentially the same liquid as used for cooling in the gas cooling device 114 of the pre-conditioning section 100. The liquid thus has a temperature of, for example, 40-80° C., specifically 45-60° C., that roughly corresponds to the temperature of the flue gas entering the gas cooling device 114. When the liquid is contacted with the flue gas in the gas heating device 160, heat is transferred from the liquid to the flue gas. The cleaned and heated flue gas, having a temperature of, e.g. 40-60° C., leaves the gas heating device via duct 46 and is released to stack 48 (shown in FIG. 1). The used liquid, having a lower temperature after passing the device as compared to before entering the device, is collected in the liquid collection receptacle 157, withdrawn via pipe 118 and directed for use in the gas cooling device 114 of the pre-conditioning section, optionally via a process cooling tower (not shown). The post-conditioning section 150 thus provides post-cleaning of the flue gas by removal of ammonia and heating of the flue gas, before releasing a cleaned and heated flue gas to stack.

Figure 3:
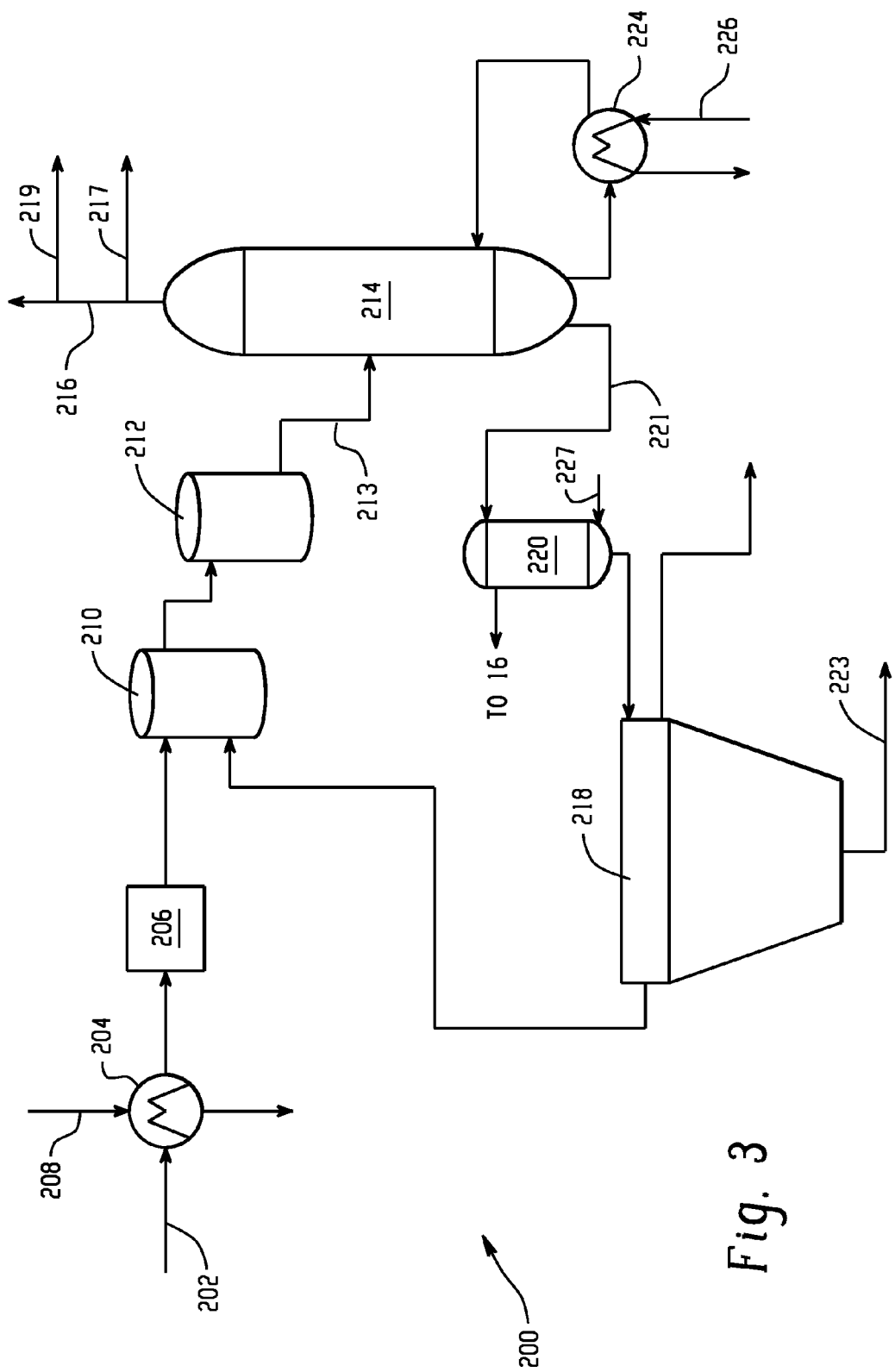
FIG. 3 is a schematic view depicting an example of a chilled ammonia process system with a lime boil system for recovery of ammonia.

Turning now to FIG. 3, the ammonium sulfate streams, produced from the sources described above (e.g. the gas-liquid contacting device 106 and the gas-liquid contacting device 152 in the cooling and cleaning system 16), can be directed to a lime boil system 200 for converting the ammonium sulfate. The lime boil system 200 is configured to produce calcium sulfate and recover ammonia from the ammonium sulfate byproduct streams. The ammonia is returned to the CAP, thereby reducing ammonia consumption in the system. The calcium sulfate byproduct produced by the lime boil process can be combined with a calcium sulfur byproduct stream from a sulfur removal device, such as a WFGD or DFGD, utilizing limestone to remove sulfur dioxide from the process gas stream. An ammonium sulfate feed stream 202, such as from one of the gas-liquid contact devices 106, 152 of the cooling and cleaning system 16, is heated as it is fed to a lime slake mill 206 via a heat exchanger 204. A steam condensate supply 208 from the CAP process can be utilized to heat the ammonium sulfate. The lime slake mill 206 is configured to slake the lime on-site into a slurry. Conventional lime slake mills are known in the art and the lime slake mill 206 described herein can by any conventional lime slake mill, such as a vertical mill, a ball mill, detention slaker, combinations thereof, and the like. The ammonium sulfate and lime slurry are combined in the reaction tanks 210 and 212. While FIG. 3 illustrates the use of two reaction tanks, it is contemplated that lime boil system 200 may include less or more devices than are shown.

A slurry 213 of calcium sulfate and ammonia produced by the reaction of the lime slurry with the ammonium sulfate stream are fed to a stripper 214, whereby the ammonia is recovered. The ammonia is regenerated in the stripper 214 to form an ammonia vapor stream 216. The ammonia vapor stream can be recycled back to the CAP, in order to reduce consumption of ammonia in the CAP process. A portion 217 of the ammonia vapor stream can be fed back to the pre-condition section 100 of the combined cooling and cleaning system 16 and/or a portion 219 of the ammonia vapor stream can be fed back to the $CO_2$-absorber 22 for use therein. The reduction in the overall consumption of ammonia in the power plant 1 will result in both material and energy savings. The calcium sulfate is extracted from the bottom of the stripper 214 in a slurry stream 221 and is fed to a gypsum thickener 218 or reaction tank for further crystal growth. The solids of the calcium sulfate slurry settle in the thickener 218 and can be extracted from the bottom of the thickener 218 as gypsum 223, which may then subject to further processing, such as filtering, dewatering, washing, and the like. An optional condenser 220 can be disposed between the stripper 214 and the gypsum thickener 218 to cool the calcium sulfate slurry stream 222 before entering the thickener 218. An air stream 227 can be in fluid communication with the condenser 220, wherein the air stream 227 is configured to extract any residual ammonia from slurry stream 221. The extracted ammonia with air can then be transferred to the cooling and cleaning stage 16 of the CAP process.

As mentioned above, the lime boil system 200 represents an improvement over other systems, because the system utilizes heat sources 226 that exist in other areas of the power plant, mainly from the CAP, that provide the necessary heat for the endothermic reaction that permits recovery of the ammonia from the ammonium sulfate stream. In one embodiment, the stripper 214 utilizes heat from the $CO_2$-lean ammoniated solution generated in the regenerator 26 of the $CO_2$-removal system 20. A heat exchanger 224 can be disposed in fluid communication with the stripper 214 such that the $CO_2$-lean ammoniated solution 32 can heat the ammonium sulfate-lime slurry within the stripper. The stripper 214 then produces the ammonia vapor stream 216, which can be directly utilized with the CAP. Conventional lime boil processes produce ammoniated liquid streams that require evaporation within the CAP direct contact cooler (pre-conditioning system 100), thereby increasing the energy requirement of the CAP. Moreover, utilization of the heated $CO_2$-lean ammoniated solution as a heat source for the stripper 214 further reduces the energy requirements of the power plant 1. In another embodiment, rather than the $CO_2$-lean ammoniated solution, the ammonia stripper overhead gas can be utilized as a heat source for the lime boil system 200. The ammonia stripper overhead is a hot gas that exits the ammonia stripper of the CAP after the ammonia has been separated from the wash liquid. Again, this reduces the energy requirements of the power plant 1, by utilizing a heat source from one system (CAP) of the plant in a different system (lime boil system 200). In still another embodiment, the heat source 226 can be a low pressure steam directed from the power plant 1.

In an alternative embodiment, the same lime boil system can be utilized in those gas purification systems and processes where sodium hydroxide is used for acid gas capture in the CAP, rather than ammonia or limestone, as was described above. In such a system, rather than an ammonium sulfate stream being produced in the sulfur removal device 12, a sodium sulfate stream is produced. It is to be noted that a CCS operating with a sodium-based scrubbing solution to form sodium sulfate, the lime boil system is used to form calcium sulfate and caustic. The caustic can be returned to the CCS to allow additional acid gas capture. As such the water wash system is designed to achieve the desired ammonia emissions to the stack to avoid producing an ammonium sulfate stream. Similarly, the system can be further utilized with Advanced Amine carbon capture processes, instead of or in addition to CAP. In Advanced Amine process, an alkali and/or alkaline earth metal hydroxide reagent is introduced into the direct contact cooler 50 and reacts with any SOx (e.g., $SO_2$, $SO_3$) entrained in the flue gas to form an aqueous alkali and/or alkaline earth metal sulfur salt solution. For example, if the flue gas includes $SO_2$ and $SO_3$ and the ammonia reagent is replaced with sodium hydroxide, the resulting reaction provides an aqueous sodium sulfite and/or sodium sulfate solution. After removal of the sulfur dioxide, the flue gas can be sent to the $CO_2$-absorber and water wash section where the flue gas is contacted with a first wash liquid comprising an amine compound (instead of ammonia), e.g., by bubbling the flue gas through the first wash liquid or by spraying the first wash liquid into the flue gas. Exemplary amine compounds include, without limitation, monoethanolamine (MEA), diethanolamine (DEA), methyldiethanolamine (MDEA), diisopropylamine (DIPA), and aminoethoxyethanol (diglycolamine), and combinations thereof The amine based wash solution may further include a promoter and/or an inhibitor.

Figure 4:
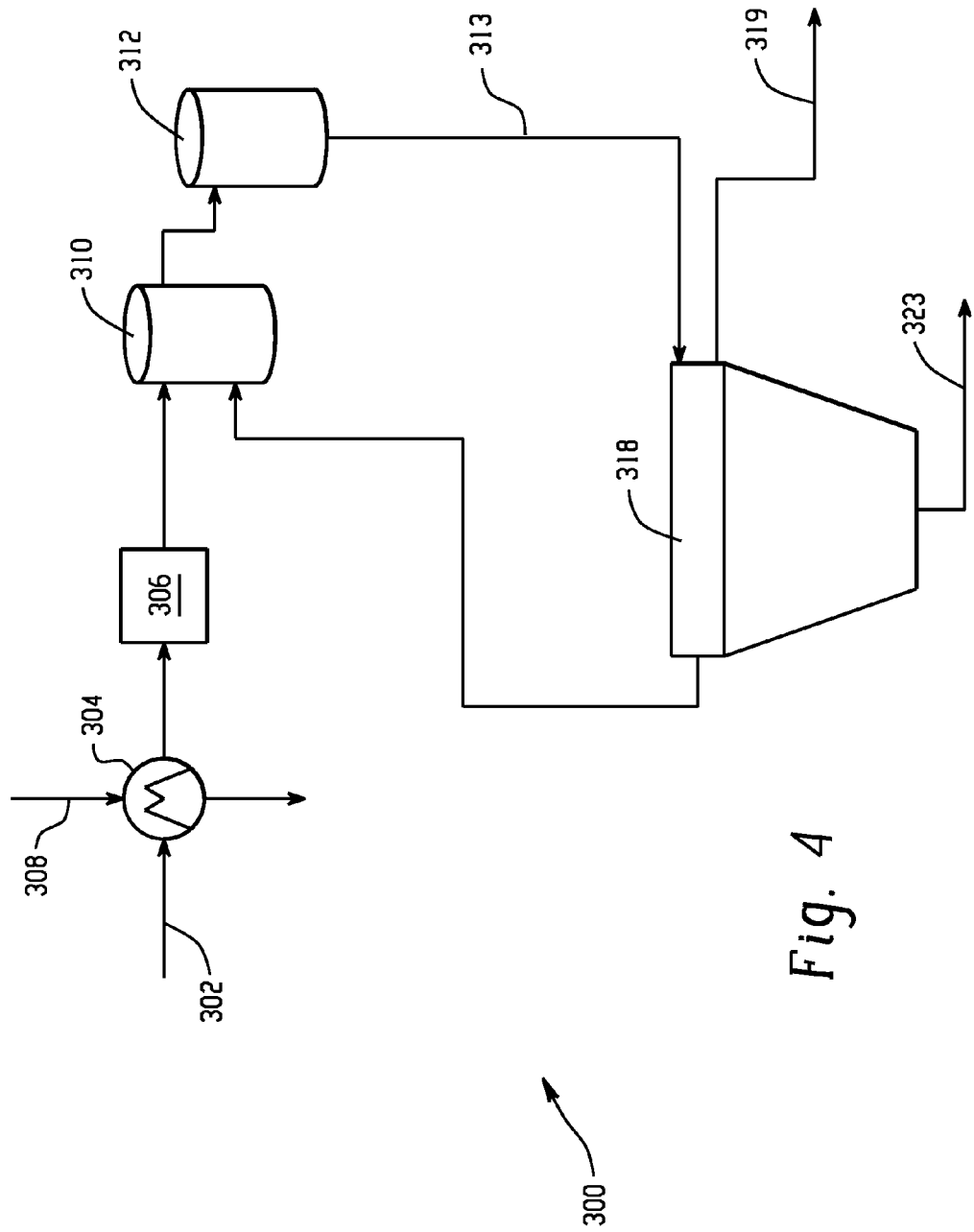
FIG. 4 is a schematic view depicting an example of a chilled ammonia and advanced amine process system that utilizes sodium hydroxide for acid gas capture.

Turning now to FIG. 4, a lime boil system 300 is illustrated for use in a power plant utilizing sodium hydroxide for acid gas capture in the CAP or Advanced Amine carbon capture system. The system 300 operates similarly to system 200, except that a separate ammonia recovery stripper 214 is not required. Rather, the sodium sulfate 302 is reacted in reactors 310, 312 with the lime slurry. A steam condensate supply 308 from the CAP/Advanced Amine process can be utilized to heat the sodium sulfate in a heat exchanger 304. A lime slake mill 306 is again configured to slake the lime on-site into a slurry. A slurry 313 of calcium sulfate and sodium hydroxide are produced in the reaction tanks an the slurry is then sent to a gypsum thickener 318, where the regenerated sodium hydroxide 319 can be purged from an upper portion of the gypsum thickener 318, while the calcium sulfate dihydrate solids settle to the bottom portion of the thickener, where the gypsum 323 can be removed and subjected to further processing, such as secondary dewatering, filtering, and the like. The gypsum solids can be disposed or sold, while the filtrate can be returned to the CAP/Advanced Amine for acid gas capture.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A process for recovering ammonia from an ammonium sulfate stream, the process comprising:
    reacting the ammonium sulfate stream with a lime slurry to form a slurry comprising calcium sulfate and ammonia;
    providing the slurry comprising calcium sulfate and ammonia to a stripper configured to recover the ammonia from the slurry;
    providing heat to the stripper by a heat source from a chilled ammonia process, wherein a carbon dioxide-lean ammoniated solution from a regenerator in the chilled ammonia process exchanges heat with the slurry comprising calcium sulfate and ammonia; and
    extracting an ammonia vapor stream from the stripper.

2. The process of claim 1, wherein the ammonium sulfate stream is produced by contacting a flue gas comprising sulfur oxides with an aqueous ammonia solution in a sulfur removal device.

3. A process for recovering ammonia from an ammonium sulfate stream, the process comprising:
    reacting the ammonium sulfate stream with a lime slurry to form a slurry comprising calcium sulfate and ammonia;
    providing the slurry comprising calcium sulfate and ammonia to a stripper configured to recover the ammonia from the slurry;
    providing heat to the stripper by a heat source from a chilled ammonia process, wherein an ammonia stripper overhead gas exchanges heat with the slurry comprising calcium sulfate and ammonia; and
    extracting an ammonia vapor stream from the stripper.

4. The process of claim 1, further comprising extracting a calcium sulfate stream from the stripper and introducing the calcium sulfate stream to a gypsum thickener.

5. The process of claim 1, further comprising providing the ammonia vapor stream to the chilled ammonia process.

6. The process of claim 5, wherein providing the ammonia vapor stream to the chilled ammonia process comprises feeding the ammonia vapor stream to a carbon dioxide absorber and/or a direct contact cooler.

7. The process of claim 1, further comprising heating the ammonium sulfate stream with a steam condensate prior to reacting the ammonium sulfate with the lime slurry.

8. A process for recovering ammonia from an ammonium sulfate stream, the process comprising:
    reacting the ammonium sulfate stream with a lime slurry to form a slurry comprising calcium sulfate and ammonia;
    providing the slurry comprising calcium sulfate and ammonia to a stripper configured to recover the ammonia from the slurry;
    providing heat to the stripper by a heat source from a chilled ammonia process; and
    extracting an ammonia vapor stream from the stripper; wherein
    the ammonium sulfate stream is produced by contacting a cooling liquid comprising sulfur dioxide with an ammoniated solution.

* * * * *